United States Patent
Wu

(10) Patent No.: US 10,369,851 B2
(45) Date of Patent: Aug. 6, 2019

(54) PUMP HEAD OF AIR PUMP

(71) Applicant: Scott Wu, Taichung (TW)

(72) Inventor: Scott Wu, Taichung (TW)

( * ) Notice: Subject to any disclaimer, the term of this patent is extended or adjusted under 35 U.S.C. 154(b) by 106 days.

(21) Appl. No.: 15/245,228

(22) Filed: Aug. 24, 2016

(65) Prior Publication Data
US 2018/0058617 A1 Mar. 1, 2018

(51) Int. Cl.
| | | |
|---|---|---|
| *B60C 23/00* | (2006.01) | |
| *F04B 33/00* | (2006.01) | |
| *F04B 39/12* | (2006.01) | |
| *F16L 37/18* | (2006.01) | |
| *F16L 37/20* | (2006.01) | |

(52) U.S. Cl.
CPC .............. *B60C 23/00* (2013.01); *F04B 33/00* (2013.01); *F04B 39/121* (2013.01); *F16L 37/18* (2013.01); *F16L 37/20* (2013.01); *Y10T 137/3724* (2015.04)

(58) Field of Classification Search
CPC .......... F16L 37/18; F16L 37/20; B60C 23/00; F04B 33/00; F04B 39/121
See application file for complete search history.

(56) References Cited

U.S. PATENT DOCUMENTS

| | | |
|---|---|---|
| 6,105,600 A | 8/2000 | Wang |
| 6,146,116 A | 11/2000 | Wu et al. |
| 6,357,760 B1 * | 3/2002 | Doyle .................. F16J 15/0881 277/602 |
| 7,866,335 B2 | 1/2011 | Wang |
| 2015/0337976 A1 | 11/2015 | Wang |

FOREIGN PATENT DOCUMENTS

| | | |
|---|---|---|
| TW | 364554 U | 7/1999 |
| TW | 201131077 A | 9/2011 |

* cited by examiner

*Primary Examiner* — Robert K Arundale
*Assistant Examiner* — Patrick C Williams
(74) *Attorney, Agent, or Firm* — Alan D. Kamrath; Mayer & Williams PC

(57) ABSTRACT

A pump head of an air pump includes a head including an outer body, a handle, and an end cap. The outer body includes a compartment extending therein. The handle is connected to a first end of the outer body. The end cap is connected to a second end of the outer body. A retaining device is received by the compartment and includes a seat actuated by the handle. An air seal ring is received by the compartment and is selectively compressed by the seat. The seat includes a cavity extending therein, at least one slot extending radially from the cavity and through the seat, and at least one retaining arm extending between two sides of the at least one slot and resiliently swingable. The air seal ring has an outer periphery section curved radially inwardly with respect to other periphery sections along a longitudinal length thereof.

17 Claims, 10 Drawing Sheets

PUMP HEAD OF AIR PUMP

BACKGROUND OF THE INVENTION

1. Field of the Invention

The present invention relates to an air pump and, particularly, to a pump head of the air pump.

2. Description of the Related Art

TW Pat. No. M318073 shows a pump head of an air pump. The pump head includes a lever being operable, a seat actuated by the lever and being movable, a valve insert biasedly connected to the seat, and a valve depressed by the seat in response to movement of the seat. Furthermore, the seat includes retaining arms retaining the valve insert and abutting the valve. The retaining arms are deformable and separate from one another. However, the retaining arms can deform in a manner that does not depress the valve effectively. Thus, the pump head can not engage with an object in an air tight manner. In addition, there are many components in the pump head.

The present invention is, therefore, intended to obviate or at least alleviate the problems encountered in the prior art.

SUMMARY OF THE INVENTION

According to the present invention, a pump head of an air pump includes a head including an outer body, a handle, and an end cap. The outer body includes a compartment extending therein. The handle is connected to a first end of the outer body. The end cap is connected to a second end of the outer body. A retaining device is received by the compartment, is restrained between the handle and the end cap, and includes a seat movable in the compartment and actuated by the handle. The seat includes a cavity extending therein, at least one slot extending radially from the cavity and through the seat, and at least one retaining arm extending between two sides of the at least one slot and resiliently swingable. An air seal ring is received by the compartment and is selectively compressed by the seat. The air seal ring has an outer periphery section curved radially inwardly with respect to other periphery sections along a longitudinal length thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

It is therefore an objective of the present invention to provide a pump head having a simple construction.

It is another objective of the present invention that components in the pump head are precisely controlled.

Other objectives, advantages, and new features of the present invention will become apparent from the following detailed description of the invention when considered in conjunction with the accompanied drawings.

DETAILED DESCRIPTION OF THE INVENTION

Figure 1:
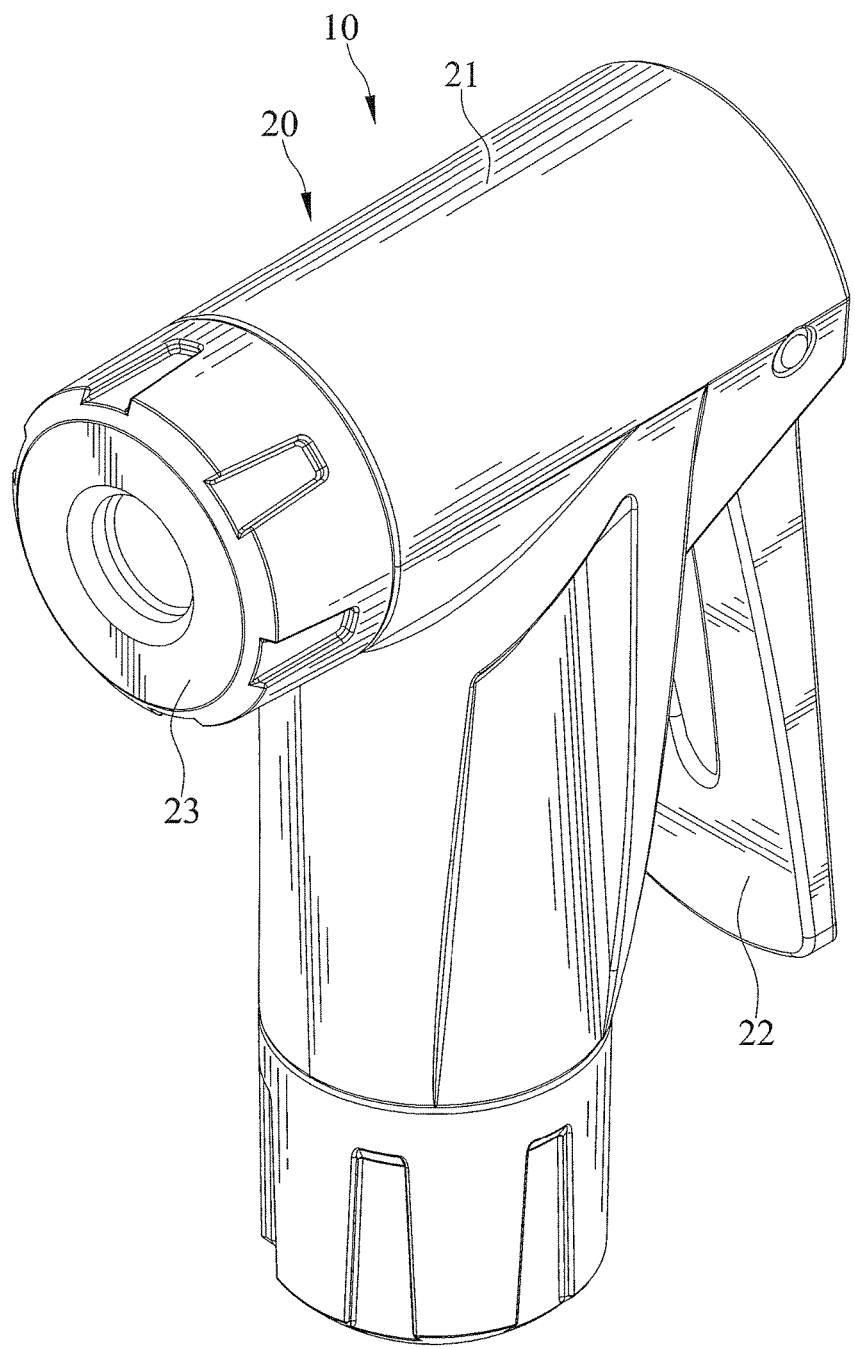
FIG. 1 is a pump head of an air pump in accordance with the present invention.
Figure 2:
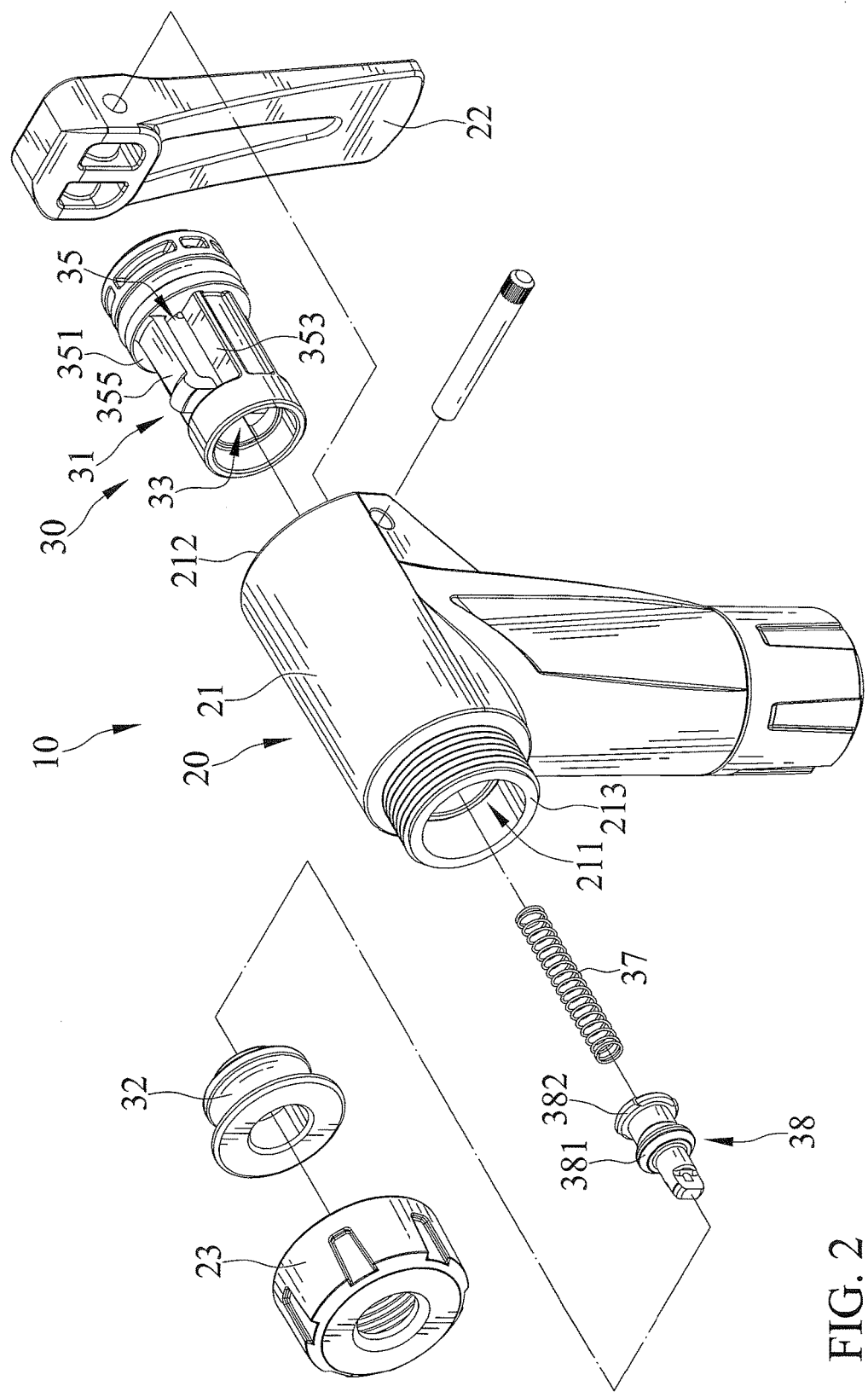
FIG. 2 is an exploded perspective view of the pump head.
Figure 3:
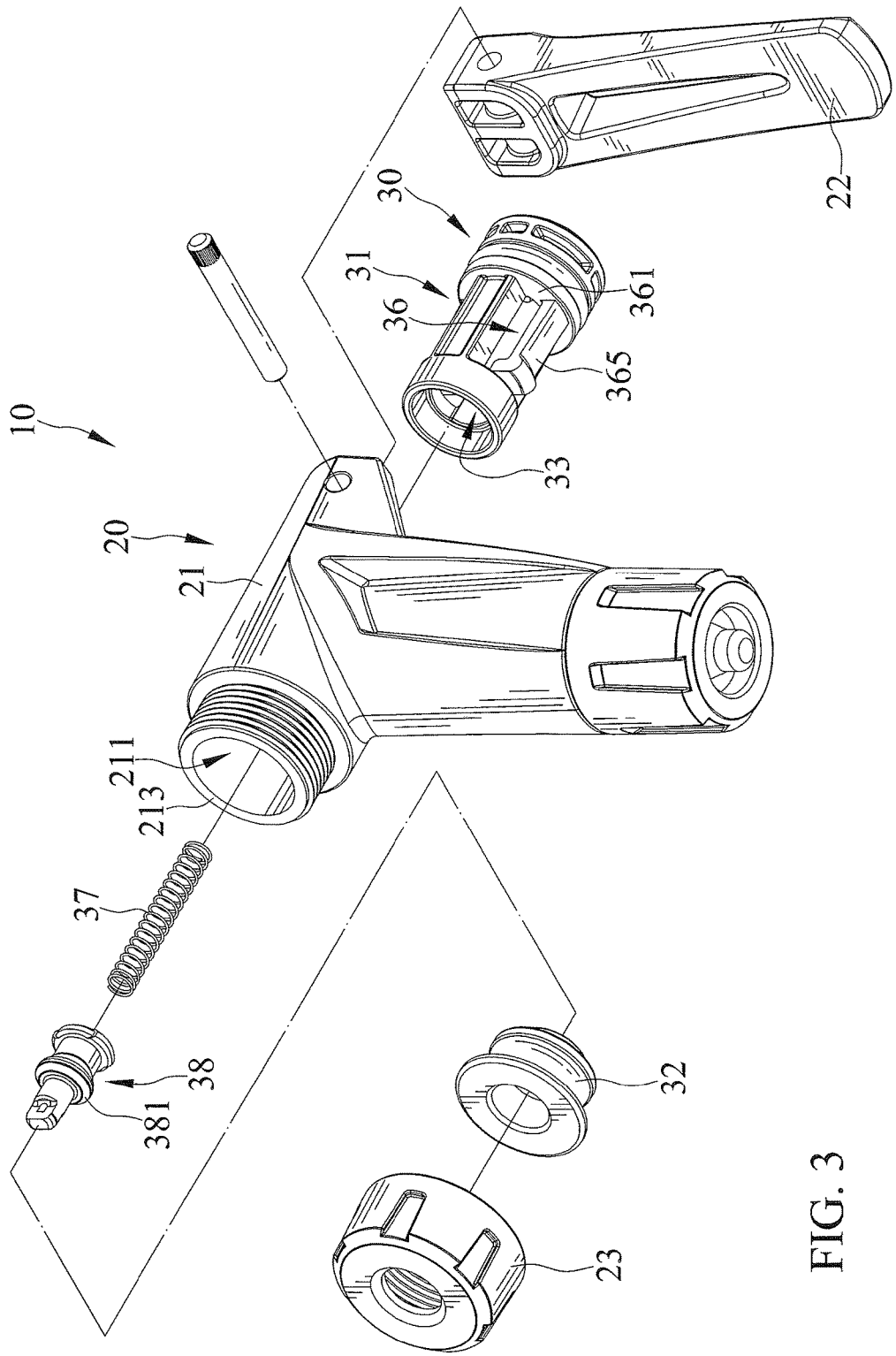
FIG. 3 is another exploded perspective view of the pump head.
Figure 4:
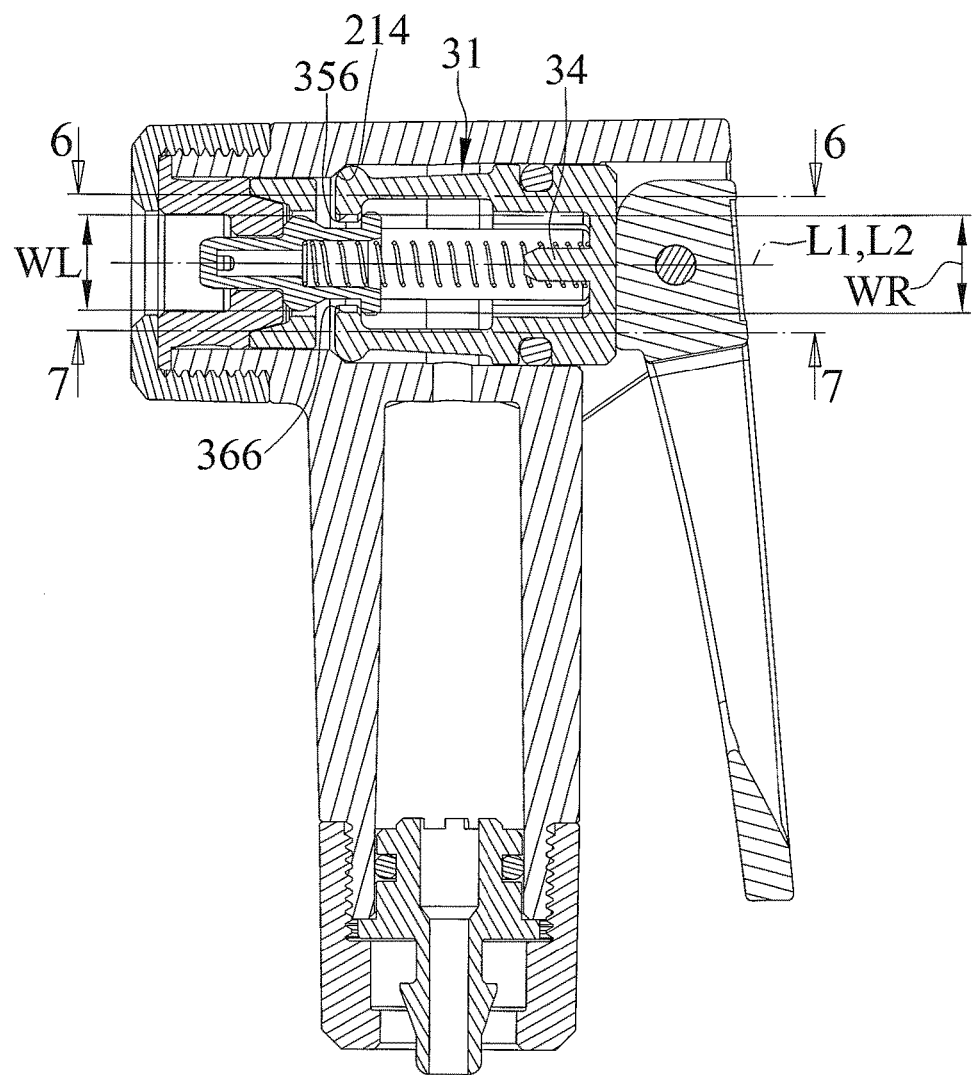
FIG. 4 is a cross-sectional view of the pump head.
Figure 5:
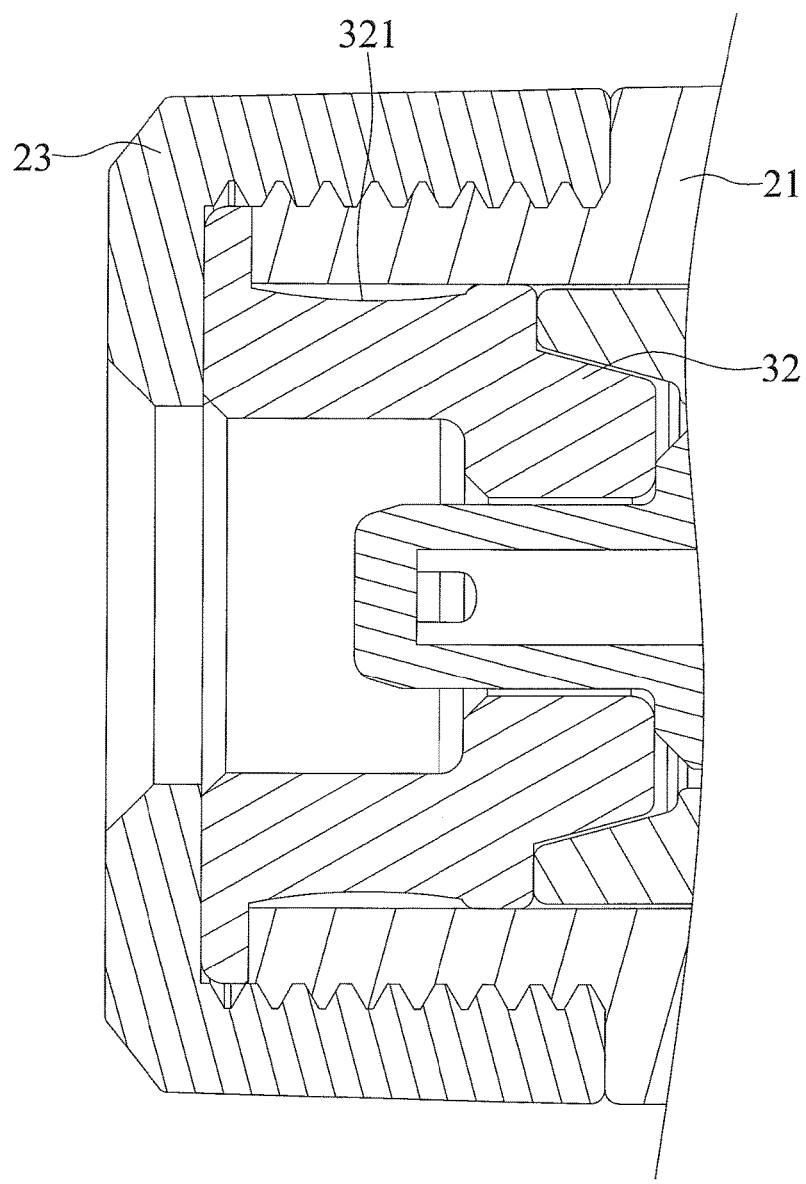
FIG. 5 is a partial, enlarged view of FIG. 4.
Figure 6:
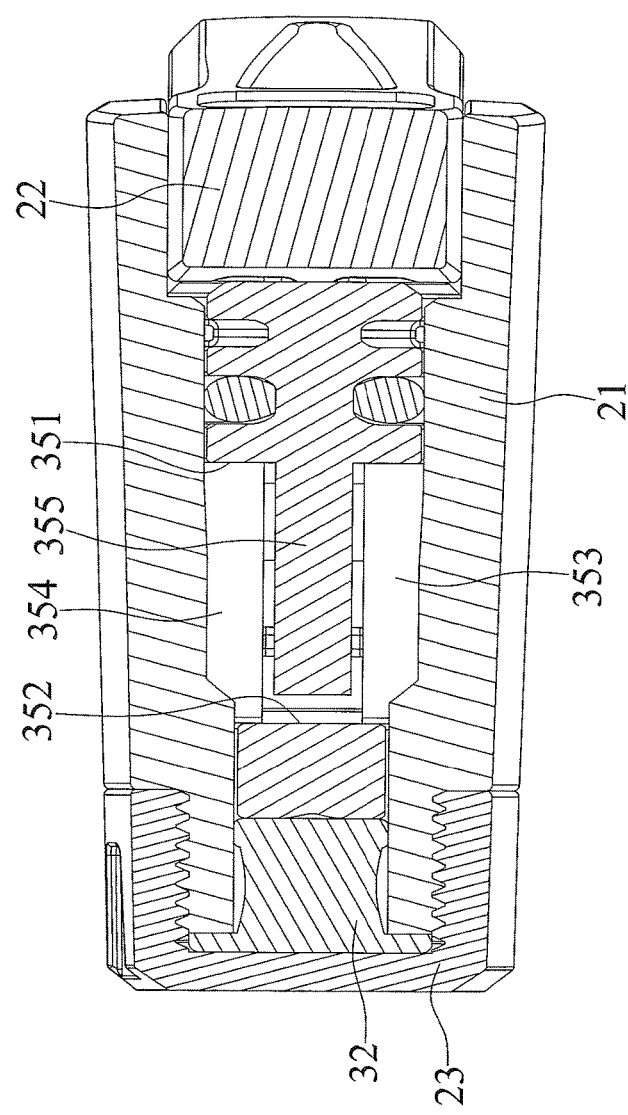
FIG. 6 is a cross-sectional view taken along line 6-6 of FIG. 4.
Figure 7:
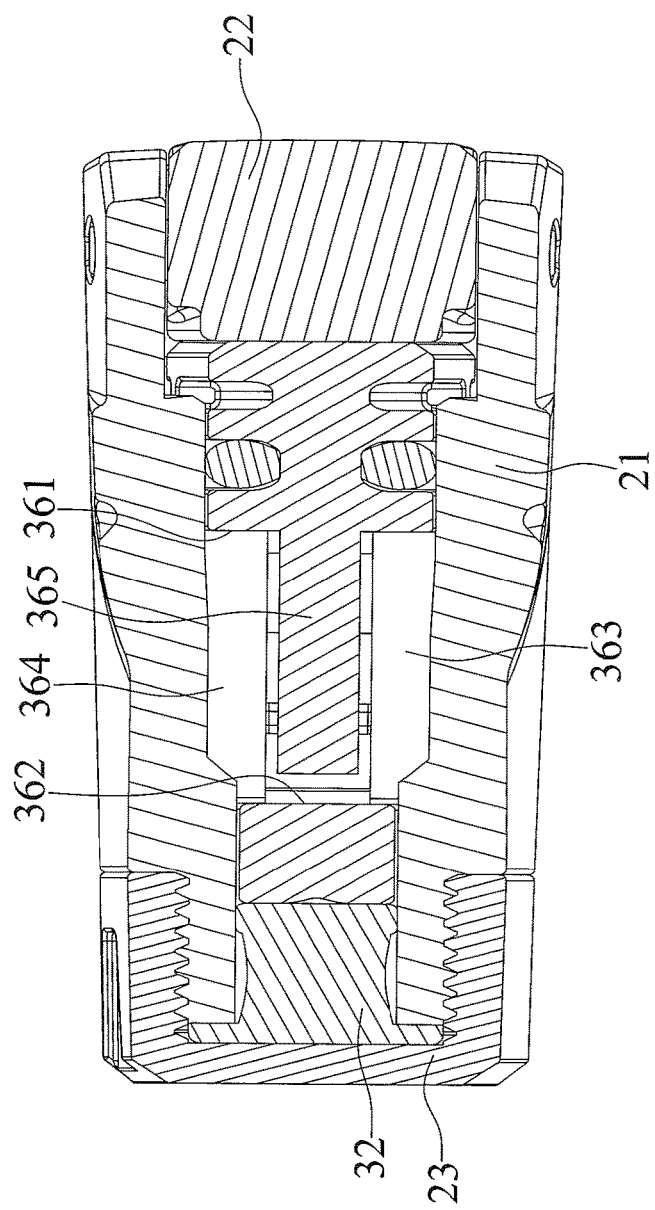
FIG. 7 is a cross-sectional view taken along line 7-7 of FIG. 4.

FIGS. 1 through 10 show a pump head 10 of an air pump. A head 20 includes an outer body 21, a handle 22, and an end cap 23. The outer body 21 includes a compartment 211 extending therein. The compartment 211 extends longitudinally along a first axis L1. The compartment 211 defines a first section and a second section larger than the first section in cross-section. The compartment 211 includes a middle periphery which extends radially outwardly from a first periphery delimiting the first section to a second periphery delimiting the second section and which defines a shoulder 214. The handle 22 is connected to a first end 212 of the outer body 21. The handle 22 defines a cam. The handle 22 is pivotally connected to the outer body 21. The end cap 23 is releasably connected to a second end 213 of the outer body 21. The end cap 23 is threadly connected to the outer body 21.

A retaining device 30 is received by the compartment 211, is restrained between the handle 22 and the end cap 23, and includes a seat 31 movable in the compartment 211 and actuated by the handle 22. The seat 31 is actuated by the cam. The seat 31 is a one-piece structure. The seat 31 includes a cavity 33 extending therein. The cavity 33 extends longitudinally along a second axis L2. The first and second axes L1 and L2 are coaxial. The seat 31 includes a protrusion 34 in the cavity 33. The seat 31 includes at least one slot extending radially from the cavity 33 and through the seat 31 and at least one retaining arm extending between first and second sides 351 and 352 of the at least one slot and resiliently swingable. The at least one retaining arm includes a retaining lug. The seat 31 is movable between a retracted position in which the second periphery abuts the retaining lug radially to a forward position in which the first periphery abuts the retaining lug radially. The at least one slot includes a first slot 35 and a second slot 36 extending radially from the cavity 33 and therethrough. The at least one retaining arm includes a first retaining arm 355 with a first end fixed to the first side 351 of the first slot 35 and a second end adjacent to, but not abutting, the second side 352 of the first slot 35 and defining a free end. The first retaining arm 355 extends along the second axis L2. The first slot 35 includes two opposite lateral sides 353 and 354 extending between the first and second sides 351 and 352 thereof. The first retaining arm 355 does not abut the two lateral sides 353 and 354. The at least one retaining arm includes a second retaining arm 365 with a first end fixed to a first side 361 of the second slot 36 and a second end adjacent to, but not abutting, a second side 362 of the second slot 36 and defining a free end. The second retaining arm 365 extends along the second axis L2. The second slot 36 includes two opposite lateral sides 363 and 364 extending between the first and second sides 361 and 362 thereof. The second retaining arm 365 does not abut the two lateral sides 363 and 364. The first and second retaining arms 355 and 365 are opposite to each other.

An air seal ring 32 is received by the compartment 211 and is selectively compressed by the seat 31. The air seal ring 32 has an outer periphery curved radially inwardly with respect to other periphery sections along a longitudinal length thereof. The air seal ring 32 has a concave outer periphery and includes a middle portion 321 not abutting the compartment 211. The air seal ring 32 includes a through hole. The air seal ring 32 includes the middle portion 321 between two portions longitudinally, and the middle portion 321 is recessed relative to the two positions. The middle portion 321 can define an arcuate recess or non-arcuate recess.

A valve insert 38 is disposed in the head 20. The valve insert 38 is movably restrained to the seat 31 by the first retaining arm 355. The valve insert 38 is received by the cavity 33. The valve insert 38 is biasedly connected to the seat 31 and a biasing member 37 includes a first end acting on the seat 31 and a second end acting on the valve insert 38. The biasing member 37 includes a hole. The protrusion 34 is inserted into the hole. The valve insert 38 has a first width WL. The seat 31 in the retracted position includes the first and second retaining lugs 356 and 366 of the first and second retaining arms 355 and 365 disposed separately at a second width WR, which is greater than the first width WL. The seat 31 in the forward position includes the first and second retaining arms 355 and 365 of the first and second retaining arms 355 and 365 disposed separately at a third width WH, which is smaller than the first width WL. The first and second retaining arms 355 and 365 swing radially toward the valve insert 38 when the seat 31 moves from the retracted position to the forward position. The valve insert 38 includes a middle portion forming a first ridge 381 and an end portion forming a second ridge 382. The first width WL measures the first ridge 381. The second ridge 382 has a width greater than the second width WR. Thus, the valve insert 38 is restrained to the seat 31. The valve insert 38 includes an end inserted into the through hole of the air seal ring 32.

The handle 22 is pivotal between a first position in which the seat 31 is in the forward position and the air seal ring 32 is compressed and a second position in which the seat 31 is in the retracted position and the air seal ring 32 is uncompressed. The handle 22 resiliently pivots from the second position to the first position via the air seal ring 32. Thus, the air seal ring 32 facilitates pivotal movement of the handle 22 from the second position to the first position, as well as movement of the seat 31 from the forward position to the retracted position.

Figure 8:
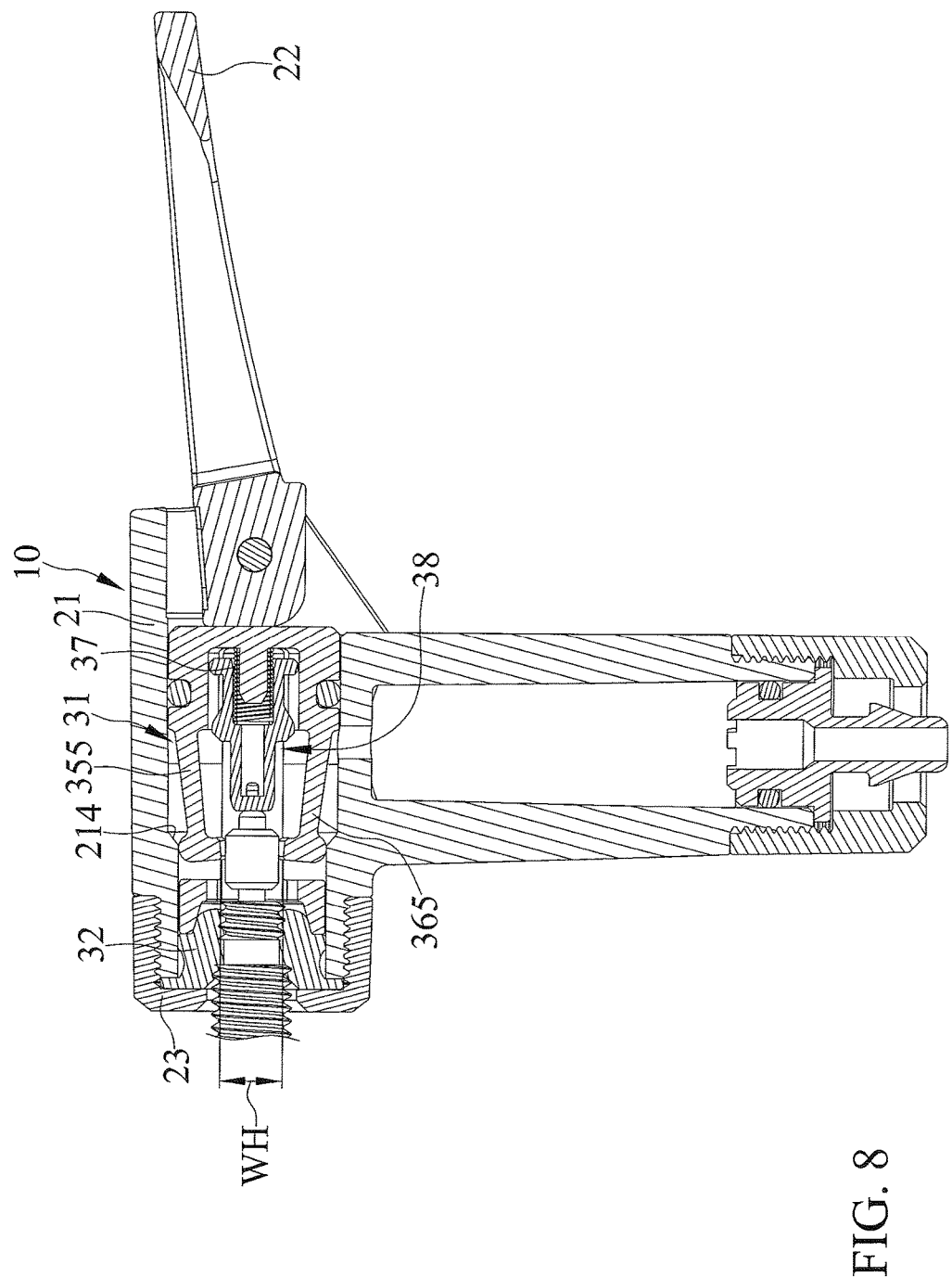
FIG. 8 illustrates the pump head in fluid communication with a French valve.
Figure 9:
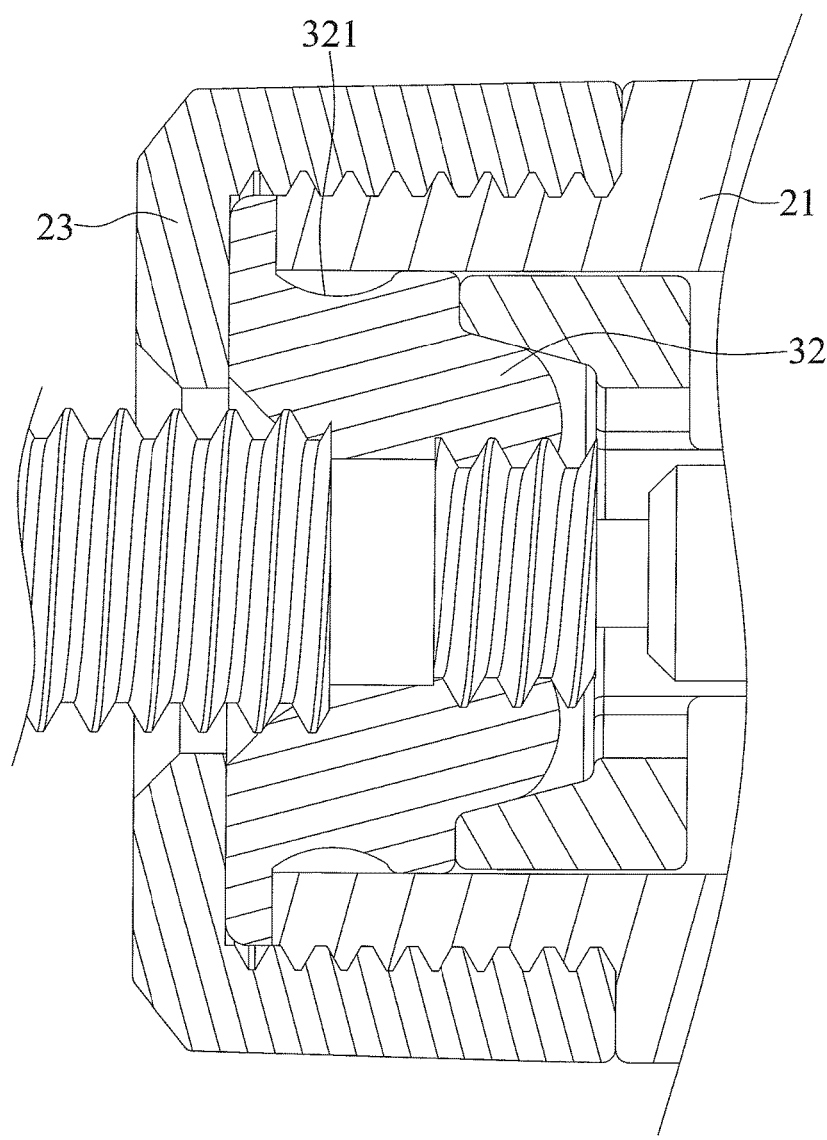
FIG. 9 is a partial, enlarged view of FIG. 8.
Figure 10:
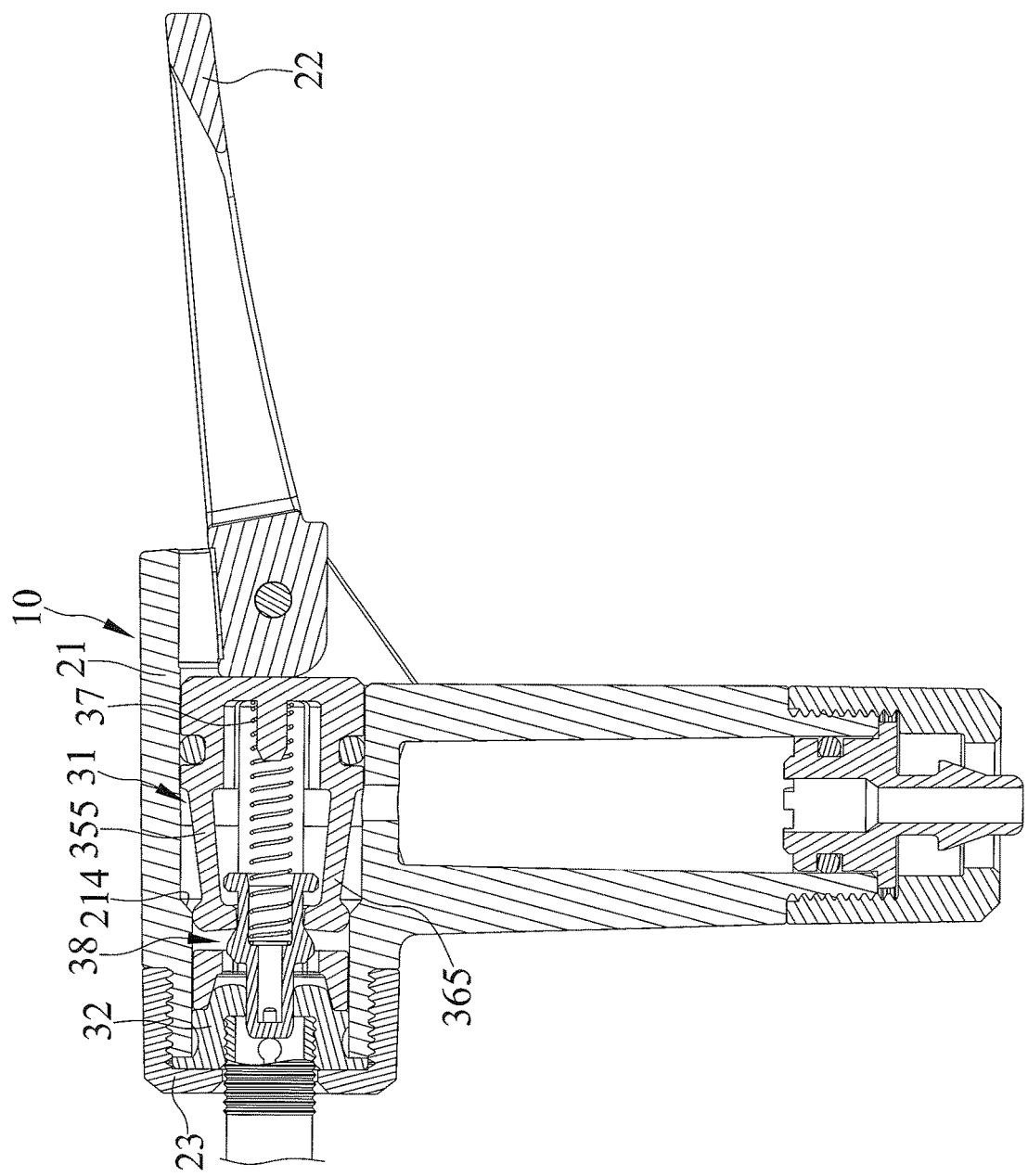
FIG. 10 illustrates the pump head in fluid communication with an American valve.

FIG. 8 illustrates the pump head 10 in fluid communication with a French valve, with the French valve inserting into and fluidly connecting to the valve insert 38. Thus, air in the pump head 10 can flow into the French valve via the valve insert 38. FIG. 10 illustrates the pump head 10 in fluid communication with an American valve, with the American valve inserting into and fluidly connecting to the valve insert 38. Likewise, air in the pump head 10 can flow into the French valve via the valve insert 38.

In view of the forgoing, the pump head 10 has a simple construction and thus saves time and costs during manufacture and assembly. Furthermore, components in the pump head 10 are precisely controlled.

The foregoing is merely illustrative of the principles of this invention, and various modifications can be made by those skilled in the art without departing from the scope and spirit of the invention.

What is claimed is:

1. A pump head of an air pump comprising:
a head including an outer body, a handle, and an end cap, wherein the outer body includes a compartment extending therein, wherein the handle is connected to a first end of the outer body, and wherein the end cap is connected to a second end of the outer body;
a valve insert disposed in the head;
a retaining device received by the compartment and including a seat movable in the compartment and actuated by the handle, wherein the seat includes a first end and a second end spaced from the first end of the seat, with the first and second ends of the seat located intermediate the first and second ends of the outer body, wherein the seat includes a cavity extending therein, at least one slot extending radially from the cavity and through the seat and extending axially from a first side spaced from the first end of the seat and a second side spaced from the second end of the seat, wherein the second side is located intermediate the first side and the end cap and at least one retaining arm configured to retain the valve insert and extending axially between the first and second sides of the at least one slot and resiliently swingable, wherein the at least one retaining arm and the seat are made in one piece, wherein the at least one retaining arm has a first end integrated with the first side of the at least one slot and a second end adjacent to, but not abutting, the second side of the at least one slot, with the second end of the at least one retaining arm forming a retaining lug, with the retaining lug moveable between a retracted position out of the cavity and an extended position into the cavity, wherein the cavity has a first end adjacent to the first end of the seat and a second end adjacent to the end cap and extending through the second end of the seat and has a first section extending axially from the first end and terminating at the retaining lug and a second section extending axially from the first section to the second end of the seat, with the second section intermediate the end cap and the first section, wherein the valve insert is received by the cavity, is movably coupled to the seat and is prevented from moving toward the end cap, and wherein the valve insert has an abutment kept within the first section of the cavity and prevented from moving out of the first section of the cavity of the seat by the retaining lug of the at least one retaining arm abutting with the abutment while in the extended position; and an air seal ring received by the compartment and selectively compressed by the seat, and wherein the air seal ring has an outer periphery section curved radially inwardly with respect to other periphery sections along a longitudinal length thereof.

2. The pump head as claimed in claim 1, wherein the air seal ring has a concave outer periphery and includes a middle portion not abutting the compartment.

3. The pump head as claimed in claim 2, wherein the valve insert is biasedly connected to the seat; with a biasing member including a first end acting on the seat and a second end acting on the valve insert.

4. The pump head as claimed in claim 3, wherein the seat includes a protrusion in the cavity, wherein the biasing member includes a hole, and wherein the protrusion is inserted into the hole.

5. The pump head as claimed in claim 2, wherein the compartment defines a first section and a second section larger than the first section of the compartment in cross-section, wherein the compartment includes a middle periphery which extends radially outwardly from a first periphery delimiting the first section of the compartment to a second periphery delimiting the second section of the compartment and which defines a shoulder, and wherein the seat is movable between a retracted position in which the second periphery abuts the retaining lug radially to a forward position in which the first periphery abuts the retaining lug radially.

6. The pump head as claimed in claim 5, wherein the handle defines a cam, wherein the seat is actuated by the cam, wherein the handle is pivotally connected to the outer body and is pivotal between a first position in which the seat is in the forward position and the air seal ring is compressed and a second position in which the seat is in the retracted position and the air seal ring is uncompressed, and wherein the handle resiliently pivots from the second position to the first position via the air seal ring.

7. The pump head as claimed in claim 6, wherein the at least one slot includes two slots and the at least one retaining arm includes two retaining arms, wherein the valve insert has a first width, wherein the seat in the retracted position includes the retaining lugs of the two retaining arms disposed separately at a second width, which is greater than the first width, wherein the seat in the forward position includes the retaining lugs of the two retaining arms disposed separately at a third width, which is smaller than the first width, and wherein the two retaining arms swing radially toward the valve insert when the seat moves from the retracted position to the forward position.

8. The pump head as claimed in claim 2, wherein the air seal ring includes a through hole, and wherein the valve insert includes an end inserted into the through hole.

9. The pump head as claimed in claim 1, wherein the at least one retaining arm has the second end defining a free end, wherein the at least one slot includes two opposite lateral sides interconnecting to and extending between the first and second sides thereof, and wherein the at least one retaining arm does not abut the two lateral sides.

10. The pump head as claimed in claim 1, wherein the valve insert is biasedly connected to the seat, with a biasing member including a first end acting on the seat and a second end acting on the valve insert.

11. The pump head as claimed in claim 10, wherein the seat includes a protrusion in the cavity, wherein the biasing member includes a hole, and wherein the protrusion is inserted into the hole.

12. The pump head as claimed in claim 1, wherein the compartment defines a first section and a second section larger than the first section in cross-section, wherein the compartment includes a middle periphery which extends radially outwardly from a first periphery delimiting the first section of the compartment to a second periphery delimiting the second section of the compartment and which defines a shoulder, and wherein the seat is movable between a retracted position in which the second periphery abuts the retaining lug radially to a forward position in which the first periphery abuts the retaining lug radially.

13. The pump head as claimed in claim 12, wherein the handle defines a cam, wherein the seat is actuated by the cam, wherein the handle is pivotally connected to the outer body and is pivotal between a first position in which the seat is in the forward position and the air seal ring is compressed and a second position in which the seat is in the retracted position and the air seal ring is uncompressed, and wherein the handle resiliently pivots from the second position to the first position via the air seal ring.

14. The pump head as claimed in claim 13, wherein the at least one slot includes two slots and the at least one retaining arm includes two retaining arms, wherein the valve insert has a first width, wherein the seat in the retracted position includes the retaining lugs of the two retaining arms disposed separately at a second width, which is greater than the first width, wherein the seat in the forward position includes the retaining lugs of the two retaining arms disposed separately at a third width, which is smaller than the first width, and wherein the two retaining arms swing radially toward the valve insert when the seat moves from the retracted position to the forward position.

15. The pump head as claimed in claim 1, wherein the air seal ring includes a through hole, and wherein the valve insert includes an end inserted into the through hole.

16. A pump head of an air pump comprising:
a head including an outer body, a handle, and an end cap, wherein the outer body includes a compartment extending therein, wherein the handle is connected to a first end of the outer body, and wherein the end cap is connected to a second end of the outer body;
a retaining device received by the compartment and including a seat movable in the compartment and actuated by the handle, wherein the seat includes a first end and a second end spaced from the first end of the seat, with the first and second ends of the seat located intermediate the first and second ends of the outer body, wherein the seat includes a cavity extending therein, at least one slot extending radially from the cavity and through the seat and extending axially from a first side spaced from the first end of the seat and a second side spaced from the second end of the seat, and at least one retaining arm extending axially between the first and second sides of the at least one slot and resiliently swingable, and wherein the at least one retaining arm has a first end fixed to the first side of the at least one slot and a second end adjacent to, but not abutting the second side of the at least one slot, with the first and second ends of the at least one retaining arm located intermediate the first and second sides of the at least one slot;

an air seal ring received by the compartment and selectively compressed by the seat, and wherein the air seal ring has an outer periphery section curved radially inwardly with respect to other periphery sections along a longitudinal length thereof;

a valve insert disposed in the head, wherein the valve insert is movably restrained to the seat by the at least one retaining arm, wherein the valve insert is received by the cavity, and wherein the valve insert is biasedly connected to the seat; and a biasing member including a first end acting on the seat and a second end acting on the valve insert;

wherein the compartment defines a first section and a second section larger than the first section in cross-section, wherein the compartment includes a middle periphery which extends radially outwardly from a first periphery delimiting the first section to a second periphery delimiting the second section and which defines a shoulder, wherein the at least one retaining arm includes a retaining lug, and wherein the seat is movable between a retracted position in which the second periphery abuts the retaining lug radially to a forward position in which the first periphery abuts the retaining lug radially; and wherein the handle defines a cam, wherein the seat is actuated by the cam, wherein the handle is pivotally connected to the outer body and is pivotal between a first position in which the seat is in the forward position and the air seal ring is compressed and a second position in which the seat is in the retracted position and the air seal ring is uncompressed, and wherein the handle resiliently pivots from the second position to the first position via the air seal ring; and wherein the at least one slot includes two slots and the at least one retaining arm includes two retaining arms, wherein the valve insert has a first width, wherein the seat in the retracted position includes the retaining lugs of the two retaining arms disposed separately at a second width, which is greater than the first width, wherein the seat in the forward position includes the retaining lugs of the two retaining arms disposed separately at a third width, which is smaller than the first width, and wherein the two retaining arms swing radially toward the valve insert when the seat moves from the retracted position to the forward position; and wherein the valve insert includes a middle portion forming a first ridge and an end portion forming a second ridge, wherein the first width measures the first ridge, and wherein the second ridge has a width greater than the second width.

17. A pump head of an air pump comprising:

a head including an outer body, a handle, and an end cap, wherein the outer body includes a compartment extending therein, wherein the handle is connected to a first end of the outer body, and wherein the end cap is connected to a second end of the outer body;

a retaining device received by the compartment and including a seat movable in the compartment and actuated by the handle, wherein the seat includes a first end and a second end spaced from the first end of the seat, with the first and second ends of the seat located intermediate the first and second ends of the outer body, wherein the seat includes a cavity extending therein, at least one slot extending radially from the cavity and through the seat and extending axially from a first side spaced from the first end of the seat and a second side spaced from the second end of the seat, and at least one retaining arm extending axially between the first and second sides of the at least one slot and resiliently swingable, and wherein the at least one retaining arm has a first end fixed to the first side of the at least one slot and a second end adjacent to, but not abutting the second side of the at least one slot, with the first and second ends of the at least one retaining arm located intermediate the first and second sides of the at least one slot;

an air seal ring received by the compartment and selectively compressed by the seat, and wherein the air seal ring has an outer periphery section curved radially inwardly with respect to other periphery sections along a longitudinal length thereof;

a valve insert disposed in the head, wherein the valve insert is movably restrained to the seat by the at least one retaining arm, wherein the valve insert is received by the cavity, and wherein the valve insert is biasedly connected to the seat; and a biasing member including a first end acting on the seat and a second end acting on the valve insert;

wherein the compartment defines a first section and a second section larger than the first section in cross-section, wherein the compartment includes a middle periphery which extends radially outwardly from a first periphery delimiting the first section to a second periphery delimiting the second section and which defines a shoulder, wherein the at least one retaining arm includes a retaining lug, and wherein the seat is movable between a retracted position in which the second periphery abuts the retaining lug radially to a forward position in which the first periphery abuts the retaining lug radially; and wherein the handle defines a cam, wherein the seat is actuated by the cam, wherein the handle is pivotally connected to the outer body and is pivotal between a first position in which the seat is in the forward position and the air seal ring is compressed and a second position in which the seat is in the retracted position and the air seal ring is uncompressed, and wherein the handle resiliently pivots from the second position to the first position via the air seal ring;

wherein the at least one slot includes two slots and the at least one retaining arm includes two retaining arms, wherein the valve insert has a first width, wherein the seat in the retracted position includes the retaining lugs of the two retaining arms disposed separately at a second width, which is greater than the first width, wherein the seat in the forward position includes the retaining lugs of the two retaining arms disposed separately at a third width, which is smaller than the first width, and wherein the two retaining arms swing radially toward the valve insert when the seat moves from the retracted position to the forward position; and wherein the valve insert includes a middle portion forming a first ridge and an end portion forming a second ridge, wherein the first width measures the first ridge, and wherein the second ridge has a width greater than the second width.

* * * * *